3,538,170
PROCESS FOR PREPARING n-ALKYL CHLORIDES
Martin Barry Bochner, Vienna, W. Va., assignor to American Cyanamid Company, Stamford, Conn., a corporation of Maine
No Drawing. Filed Apr. 10, 1968, Ser. No. 720,363
Int. Cl. C07c 19/00
U.S. Cl. 260—652                                10 Claims

ABSTRACT OF THE DISCLOSURE

The reaction of n-alkanols with phosphorus trichloride to form n-alkyl chlorides is conducted in the presence of dimethylformamide, as promoter, and the reactants and promoter are brought together in a particular order, whereby the yields and purity of the n-alkyl chloride product are enhanced.

---

This invention relates to an improved process for the preparation of n-alkyl chlorides. More particularly, it relates to a process for the manufacture of n-alkyl chlorides in improved yield and purity by the reaction of n-alkanols and phosphorus trichloride.

Alkyl halides can be prepared from n-alkanols by a number of synthetic routes depending upon several factors, including the kind of halogen and the molecular weight of the alkyl moiety. The alkyl chlorides have been the most difficult of the halides to obtain in high yield and purity. Several preparative routes have been used with varying degrees of success. The most generally suitable reaction is that of an n-alkanol with thionyl chloride. Alternatively, the alcohol can be treated with hydrogen chloride and, optionally, a catalyst, e.g., zinc chloride. However, this reaction requires special equipment and generally produces isomeric mixtures.

The preparation of n-alkyl chlorides from alcohols and phosphorus trichloride has not been efficiently and economically achieved up to the present time. Generally, the reaction is accompanied by the evolution of large quantities of gaseous hydrogen chloride and formation of by-product phosphorous acid esters. Acid acceptors, such as pyridine, have been used with limited success in improving the reaction. In general, yields are low and product purity is poor. What is needed, therefore, is an efficient process for the manufacture of n-alkyl chlorides from n-alkanols and phosphorus trichloride, whereby improved yields and product purity are obtained.

It has now been discovered that n-alkyl chlorides are obtained in high yield and purity when n-alkanols are reacted with phosphorus trichloride in the presence of reaction-promoting amounts of dimethylformamide and a specific order of addition of ingredients is followed in preparing the reaction mixture.

Accordingly, it is the principal object of the present invention to provide a process for the preparation of n-alkyl chlorides from the reaction of n-alkanols and phosphorus trichloride which results in improved yields and purity of the product formed. Other objects will be apparent from the following detailed description.

The process of the present invention is markedly superior to previous processes for the manufacture of n-alkyl chlorides by the reaction of n-alkanols with phosphorus trichloride in that it provides a selective reaction, to the substantial exclusion of competing side reactions that lead to undesired by-products, e.g., phosphorous acid esters. In order to obtain the selective substitution reaction, however, it is necessary that the dimethylformamide and the n-alkanol be added to the phosphorus trichloride in forming the reaction mixture. That such selectivity could be obtained in the reaction is highly surprising.

Thus, the present process provides markedly higher yields of alkyl halides than have been obtainable heretofore and the purity of the products is such as to enable their use as alkylating agents without further purification.

The alkyl chlorides obtained by the process of the present invention have many known uses, principally as inexpensive alkylating agents. In particular, they are useful in the alkylation of poly(hydroxy)benzophenones in the production of ultraviolet absorbers and offer economic advantages over n-alkyl bromides normally used in such production.

According to the process of the present invention, an n-alkanol and a reaction-promoting amount of dimethylformamide are added to an appropriate quantity of phosphorus trichloride to form a liquid reaction mixture which is subsequently heated to a temperature in the range of 75° C. to 100° C. to form the n-alkyl chloride. The reaction is represented by the following equation:

$$PCl_3 + 3ROH \xrightarrow{DMF} 3RCl + H_3PO_3$$

The n-alkanols useful in the process of the present invention are those having from 4 to about 18 carbon atoms. Thus, lower alkanols produce n-alkyl chlorides whose low boiling temperatures create special problems. On the other hand, higher alkanols because of their higher melting temperatures and wax-like nature introduce problems which reduce the efficiency of the process. Suitable alkanols include, for example, n-butanol, n-pentanol, n-hexanol, n-heptanol, n-octanol, n-nonanol, n-decanol, n-undecanol, n-dodecanol, n-tridecanol, n-tetradecanol, n-pentadecanol, n-hexadecanol, n-heptadecanol, and n-octadecanol.

The phosphorus trichloride used in the process should have a good degree of purity so as to avoid contamination of the alkyl halide product. The amount of phosphorus trichloride employed in the present process must be at least a stoichiometric equivalent to the amount of n-alkanol employed and preferably is in excess of such amount. Thus, the amounts of n-alkanol and phosphorus trichloride used in the reaction should be such that the mole ratio of the former to the latter is from about 1.6 to 3.0 and preferably from about 2.0 to 2.7. Ratios outside the range specified offer no advantage in the process and constitute economic disadvantages.

Dimethylformamide is the preferred promoter for use in the process. Related substituted amides, such as dimethylacetamide and tertiary butylformamide, may also be used with success, but are less attractive economically. The amount of dimethylformamide or other substituted amide used may be from about 0.1 to about 1.0 mole, and preferably from about 0.4 to 0.7 mole per mole of n-alkanol. There is no particular advantage to the use of higher amounts of dimethylformamide while product yield and purity suffer when lower amounts are employed.

In carrying out the process, the required amount of phosphorus trichloride is charged to a suitable reactor and the required amounts of dimethylformamide and n-alkanol are added thereto. The dimethylformamide and the alkanol may be added either separately or as a mixture thereof with the rate of addition being controlled so as to avoid a sharp temperature increase. Also, when added separately it is preferred to first add at least a portion of the dimethylformamide so as to minimize possible side reactions in the course of adding the alkanol. However, it is preferred to add an equi-molar mixture of the dimethylformamide and n-alkanol and then add any additional n-alkanol that may be required. The additions may be made incrementally, if desired, but it is generally preferred to add the mixture of n-alkanol and dimethylformamide as rapidly as possible, consistent with temperature control.

Phosphorus trichloride boils at 76° C., so that in preparing the reaction mixture it is necessary to avoid exceeding this temperature to prevent losses of this reactant. Thus, in the formation of the reaction mixture, temperatures in the range of about 0.° C. to about 75° C. may be employed. The preferred temperature range is from about 50° C. to about 70° C., since under such conditions initial reaction occurs upon contact of the reactants and the mixture is maintained in liquid form. It is preferred to add the other ingredients to the phosphorus trichloride at a rate consistent with this temperature range.

After the reactants have been added and the initial reaction has occurred, the reaction mixture is heated to a temperature in the range of about 75° C. to about 100° C. and maintained in this range for a time period that will maximize yield and still minimize contaminaton of the desired product. While the time period will vary for particular alkanols and the specific temperature employed, it is generally found that a time period within the range of about 4 to about 12 hours is eminently suitable. The lower temperature limit cited above is occasioned by the fact that n-butyl chloride refluxes at a temperature of about 75°–80° C. when prepared in accordance with the present process. While a higher temperature could be employed if provision is made for increased pressure, this is unnecessary for efficient preparation of n-butyl chloride or other n-alkyl chlorides by the present process. It has been found furthermore, that when the heating is carried out at temperatures below about 75° C., crystallization of phosphorus acid and other by-products can occur which can interfere in obtaining product of the desired purity. When temperature above about 100° C. are employed, polymerization of phosphorus acid can occur which also interferes in obtaining product of the desired purity.

Upon completion of the heating stage of the reaction as described above, the n-alkyl chloride is recovered from the reaction mixture by well-known methods. In the case where n-butyl chloride is prepared, the reaction mixture may be treated with water to dilute the phosphorus acid and the product recovered by distillation. In other cases, the addition of water to dilute the phosphorus acid and dissolve out solubles may be made and the product layer recovered. This layer may then be further treated with aqueous alkali and subsequently aqueous brine to further reduce contaminants. Drying of the thus-processed product results in n-alkyl chlorides of high purity without the need of additional treatment. However, if greater purity is desired, the product may be further purified by such procedures as distillation, selective solvent treatments, fractionation, etc.

The invention is illustrated by the following examples. In all instances product purity was determined by means of vapor phase chromatography.

EXAMPLE 1

Preparation of n-octyl chloride (A) To 471.2 grams (3.42 moles) of phosphorus trichloride in a reaction flask there was added, portionwise, a mixture of 350.4 grams (4.7 moles) of dimethylformamide and 1040 grams (8 moles) of n-octyl alcohol over a thirty minute period while maintaining the temperature of reaction mixture at about 60° C. The mixture was then heated to 94–97° C. and held at that temperature for 8 hours. The product mixture was then transferred to a separatory funnel, 400 ml. of water added and after 15 minutes agitation the lower (water) layer was withdrawn and discarded. A second wash with 400 ml. of NaOH solution (pH, 8–10) was made. After withdrawing this wash, a final wash with 400 ml. of 5% brine solution (aqueous) was made. There was recovered 1073 grams of n-octyl chloride of 97% purity. This represented 1040 grams of pure product and a yield of 87.6% of theory.

The foregoing illustrates a preferred procedure in accordance with the present invention.

(B) The procedure of A, above, was repeated except that, in this instance, the phosphorus trichloride was added to the mixture of dimethylformamide and n-octyl alcohol. There was obtained 878 grams of n-octyl chloride of 58.9% purity. This represented 516 grams of pure product and a yield of 43.5% of theory.

The relatively poor yield and purity of the product obtained in B, as compared to A, demonstrate the importance of adding the alcohol to the phosphorus trichloride rather than vice versa, even when employing dimethylformamide as promoter in the reaction.

EXAMPLE 2

Preparation of n-butyl chloride

A mixture of 43.8 grams (0.6 mole) of dimethylformamide and 45 grams (0.61 mole) of n-butanol was added over a period of 18 minutes to 58.9 grams (0.428 mole) of phosphorus trichloride at 60° C. An additional 29 grams (0.39 mole) of n-butanol was then added over a 12 minute period at 58–62° C. The reaction mixture was heated to reflux at 76–80° C. and held for 4 hours. Water, 200 ml., was then added and the product distilled and dried. There was obtained 75 grams of n-butyl chloride of 98.7% purity. This represents 74.0 grams of pure product and a yield of 80% of theory.

This example illustrates another preferred embodiment of the present invention.

EXAMPLE 3

Preparation of n-octyl chloride

To 67.3 grams (0.49 mole) of phosphorus trichloride at 60° C. was added a mixture of 43.8 grams (0.6 mole) of dimethylformamide and 78 grams (0.6 mole) of n-octyl alcohol and then an additional 52 grams (0.4 mole) of n-octyl alcohol. The total addition time was 2 hours and the temperature was maintained at 60° C. throughout this time period. The reaction mixture was then heated to 95° C. and maintained at this temperature for 8 hours. The reaction mixture was then processed as in Examples 1(A) to recover the product. There was obtained 143 grams of n-octyl chloride of 97.8% purity. This represents 139.8 grams of pure product and a yield of 94% of theory.

This example represents the best mode of operating the present invention.

I claim:

1. In the process of preparing an n-alkyl chloride by reaction of an n-alkanol with phosphorus trichloride, the improvement which comprises adding to the phosphorus trichloride (a) an n-alkanol containing from about 4 to about 18 carbon atoms and (b) dimetyhlformamide at a temperature such as to provide a liquid reaction mixture, the amount of n-alkanol so added being such as to provide a mole ratio of n-alkanol to phosphorus trichloride in the reaction mixture of from about 1.6 to about 3.0 and the amount of dimethylformamide so added being such as to provide a mole ratio of dimethylformamide to n-alkanol of from about 0.1 to about 1.0, heating the reaction mixture at a temperature from about 75° C. to about 100° C., and recovering the n-alkyl chloride product.

2. The process of claim 1 wherein a substantially equimolar mixture of the dimethylformamide and the n-alkanol is added to the phosphorus trichloride and the additional n-alkanol to make up the said mole ratio of n-alkanol to phosphorus trichloride being added after the addition of the equi-molar mixture.

3. The process of claim 1 wherein the reaction mixture is formed at a temperature of from about 50° C. to about 70° C.

4. The process of claim 1 wherein the n-alkanol contains at least 5 carbon atoms and the reaction mixture is heated at a temperature of from about 90° C. to about 100° C. for a time period of from about 4 to about 12 hours.

5. The process of claim 1 wherein the n-alkanol is n-butanol and the reaction mixture is refluxed at a temperature of from about 75° C. to about 80° C. for about 4 hours.

6. The process of claim 1 wherein the mole ratio of the n-alkanol to the phosphorus trichloride is from about 2.0 to about 2.7.

7. The process of claim 1 wherein the mole ratio of the dimethylformamide to the n-alkanol is from about 0.4 to about 0.7.

8. The process of claim 1 wherein the n-alkyl chloride is recovered by distillation.

9. The process of claim 1 wherein the n-alkyl chloride is recovered by consecutive washes with water, aqueous alkali, and aqueous brine.

10. A process of preparing n-octyl chloride by the reaction of n-octanol with phosphorus trichloride, which comprises adding to 1 mole proportion of phosphorus trichloride a mixture consisting of (a) approximately 1.2 mole proportions of n-octanol and (b) approximately 1.2 mole proportions of dimethylformamide and then adding approximately 0.8 mole proportion of n-octanol, said additions being made while maintaining the temperature of the reaction mixture at from about 50° C. to about 70° C., heating the reaction mixture at a temperature of from about 90° C. to about 100° C. for a time of from about 4 to about 12 hours, and recovering the n-octyl chloride product.

References Cited

UNITED STATES PATENTS 3,432,561   3/1969   Dadekian _____ 260—652

HOWARD T. MARS, Primary Examiner